United States Patent
Kraft, IV et al.

(10) Patent No.: US 6,931,130 B1
(45) Date of Patent: Aug. 16, 2005

(54) DYNAMICALLY ADJUSTABLE SOFTWARE ENCRYPTION

(75) Inventors: George Kraft, IV, Austin, TX (US); Richard Lee Verburg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/414,333

(22) Filed: Oct. 7, 1999

(51) Int. Cl.⁷ .............................................. H04K 1/00
(52) U.S. Cl. ........................ 380/258; 380/270; 380/59; 713/154; 713/162; 455/428; 455/429
(58) Field of Search ................................ 380/258, 270, 380/59; 713/154, 162; 455/428, 429

(56) References Cited

U.S. PATENT DOCUMENTS

| | | | |
|---|---|---|---|
| 5,651,068 A * | 7/1997 | Klemba et al. ............. | 713/159 |
| 5,732,349 A | 3/1998 | Sanpei et al. | |
| 6,470,447 B1 * | 10/2002 | Lambert et al. ............ | 713/151 |

FOREIGN PATENT DOCUMENTS

| | | |
|---|---|---|
| EP | 0 779 760 A1 | 6/1997 |
| EP | 0 825 511 A2 | 2/1998 |
| GB | 2 348 568 A | 4/2000 |
| WO | WO 00/65768 A1 | 4/2000 |
| WO | WO 01/08435 A1 | 1/2001 |

* cited by examiner

*Primary Examiner*—Paul E Callahan
(74) *Attorney, Agent, or Firm*—Joseph P. Lally; Casimer K. Salys; Bob Carwell

(57) ABSTRACT

A method, system, and computer program product for dynamically adjusting the encryption level based on the geographic location of a software program are disclosed. The method includes an initial step of determining a geographic location associated with the software program. An encryption level is selected based upon the determined geographic location. The software program is then executed utilizing the selected encryption level. In one embodiment, determining the geographic location is achieved by determining the geographic location of a computer system on which the software program will be executed, preferably through the use of a Global Positioning System. The Global Positioning System may comprise an I/O device of the computer system on which the software executes. In one embodiment, the selected encryption level may be overridden by a Smart Card or other secure device connected to the computer system. In one embodiment, the available encryption levels include, at a minimum, a U.S. encryption level, a non-French European encryption level, and a French encryption level.

18 Claims, 2 Drawing Sheets

DYNAMICALLY ADJUSTABLE SOFTWARE ENCRYPTION

BACKGROUND

1. Field of the Present Invention

The present invention relates to the field of software encryption and more particularly to a system and method of determining software encryption levels based on geographical location.

2. History of Related Art

Encryption of software is used in a variety of applications in which data or other information is transmitted over or stored on an un-secure medium such as, for example, the internet. In many nations, the encryption of software is subject to governmental regulation. Software for use in the U.S. and Canada, for example, may utilize 128-bit encryption while French authorities prohibit software encryption levels in excess of 40 bits. As a result of varying governmental regulations, software manufacturers are frequently required to manufacture and sell at least three versions of encrypted software to meet the restrictions of U.S., French, and European encryption regulations. Maintaining and mass producing three or more versions of every application program that utilizes encryption presents a highly undesirable administrative and manufacturing burden on software manufacturers. Therefore, it is highly desirable to implement a mechanism by which a single piece of software can be distributed in any geographic region regardless of the region's encryption regulations.

SUMMARY OF THE INVENTION

The identified problem is, in large part, addressed by a method for dynamically adjusting the encryption level based on geographic location. Broadly speaking, the method includes an initial step of determining a geographic location associated with the software program. An encryption level is selected based upon the determined geographic location. The software program is then executed utilizing the selected encryption level. In one embodiment, determining the geographic location is achieved by determining the geographic location of a computer system on which the software program will be executed, preferably through the use of a Global Positioning System (GPS). The GPS may comprise an I/O device of the computer system on which the software executes. In one embodiment, the selected encryption level may be overridden by a Smart Card or other secure device connected to the computer system. In one embodiment, the available encryption levels include, at a minimum, a U.S. encryption level, a non-French European encryption level, and a French encryption level.

BRIEF DESCRIPTION OF THE DRAWINGS

Other objects and advantages of the invention will become apparent upon reading the following detailed description and upon reference to the accompanying drawings in which.

Figure 1:
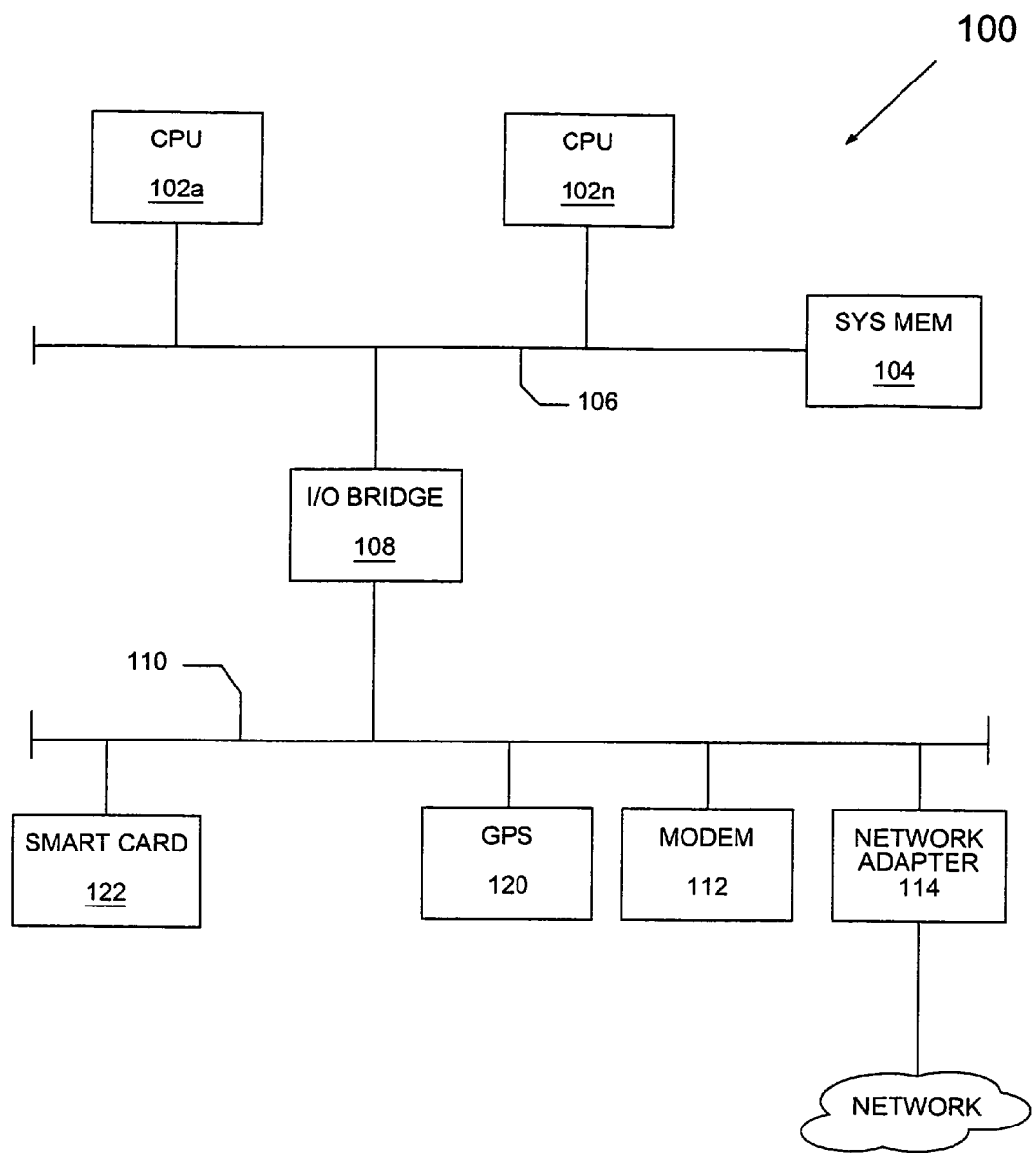
FIG. 1 is a simplified block diagram of a computer system suitable for use with one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a simplified block diagram of a computer system 100 suitable for use with one embodiment of the invention. Computer system 100 includes one or more processors 102a . . . 102n (generically or collectively referred to herein as processor(s) 102). Processors 102 may comprise any of a variety of commercially distributed processors such as, for example, RS6000, PowerPC, 68000, and x86 compatible processors. A system memory 104 is accessible to processors to 102 via a host bus 106. Processors 102 execute software programs that are stored in system memory 104. A host bridge 108 provides an interface between a host bus 106 and a peripheral bus 110. Peripheral bus 110 is preferably compliant with an industry standard I/O bus such as, for example, a PCI, AGP, EISA, ISA, or other suitable bus. In one presently preferred embodiment, I/O bus 110 is compliant with Rev. 2.2 or later of the PCI local bus specification available from the PCI Special Interest Group (www.pcisig.com) and incorporated by reference herein. I/O bus 110 provides a standardized bus to which a variety of I/O adapters can be attached to expand the capabilities of computer system 100. The embodiment of computer system 100 depicted in FIG. 1 includes, as examples, a modem device 112 for enabling computer system 100 to communicate via an external phone line and a network adapter 114 that enables computer system 100 to communicate with one or more like computer systems. Computer system 100 according to the present invention further includes a Global Positioning System (GPS) adapter or device 120. GPS 120 includes facilities for determining the geographic location in which computer system 100 physically resides. GPS 120 as depicted in FIG. 1 further includes an I/O bus interface for communicating this geographic information via I/O bus 110. In one embodiment, GPS 120 comprises a PCI compatible GPS adapter. PCI compatible GPS adapters suitable for use as GPS 120 are commercially distributed by a number of vendors at a relatively inexpensive cost.

Figure 2:
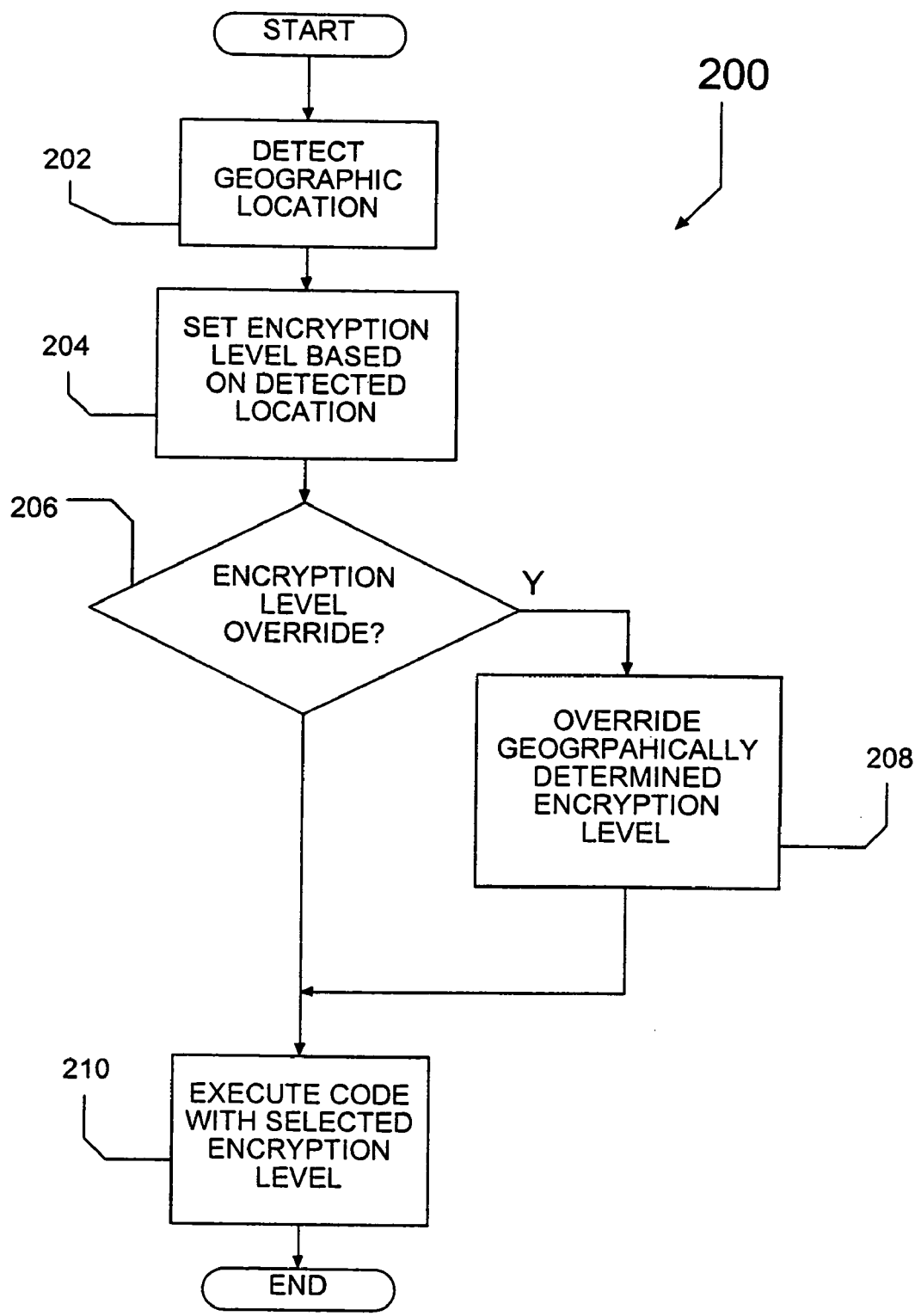
FIG. 2 is a flow diagram of an encryption method according to one embodiment of the present invention.

One embodiment of the present invention contemplates a set of computer instructions encoded on a computer readable medium. When the instructions are being executed by processors 102, the instructions typically reside in system memory 104. At other times, the computer instructions may reside on a hard disk (not depicted) connected to I/O bus 110 via a hard disk controller, a floppy diskette, a non-volatile memory device such as an EPROM or a flash memory device. In the preferred embodiment, the computer instructions include instructions suitable for executing the method 200 depicted in FIG. 2. Method 200 includes a step 202 in which geographic location information, such as the output of a GPS, is detected. In one embodiment, the GPS detection in step 202 occurs as an initial step in the execution of a software program such that the software program determines the geographic location of the system on which the software is executing. In response to determining the geographic location in step 202, an encryption level indicator is set in step 204. The encryption level is set, in one embodiment, based upon a value in a look-up table that associates particular encryption levels with specified geographic locations. If the GPS signal detection in step 202 indicates that the software is executing in France, for example, the encryption level indicator set in step 204 is set based upon a value in a look-up table which associates geographical location of France with a 40-bit encryption level. If a software program including facilities for executing method 200 according to the present invention is later invoked in the United States or Canada, the GPS signal in step 202 will result in the setting of encryption level indicator in step 204 to a 128-bit encryption. Based upon the setting in the encryption level indicator, data transmitted by the software program will be encrypted with the appropriate encryption level. The ability to determine at execution time the appropriate level of encryption based upon the geographic location enables software manufacturers to produce and distribute a single version of a particular software application or operating system on a global scale. In the absence of such a facility, the manufacturer is typically required to produce, maintain, and distribute various versions of the software each version essentially identical to the other except for the level of software encryption. As will be appreciated to those familiar with computer software programming, maintaining multiple versions of a single software application is highly undesirable. Almost without exception, software programs generally require modifications or updates. If an application is distributed in multiple versions depending upon geography, what would otherwise be a relatively routine software update procedure might present a significant and unnecessary administrative burden to incorporate the update in each of existing versions of the software. In addition, enforcement of existing software encryption regulations is difficult if not impossible to accomplish in a reliable fashion by simply requiring that the original purchaser or user of the software be located in a geographic region suitable for the level of encryption that is purchased or downloaded. If a desk top or lap top computer is relocated from a country in which one level of encryption is mandated to a country in which a second level of encryption is used, there is a significant likelihood that software appropriate for use in the first country might be inappropriate for use in the second country. In contrast, the dynamic encryption level detection enabled by tying the encryption level to the output of a GPS device ensures that the appropriate encryption level is maintained.

Returning now to FIG. 1, one embodiment of computer system 100 further includes a Smart Card 122 that may be coupled to computer system 100 via I/O bus 110. Preferably, Smart Card 122 includes a suitable storage facility (memory) and built-in logic to control access to the memory. In the preferred embodiment, Smart Card 122 can be set to write protect some or all of the memory array and can be configured to restrict access to both reading and writing through the use of a password or system key all as is well known in the field of Smart Card devices. Smart Card 122 provides the ability to override the encryption level indicated by the geographic location. Users of software in a foreign embassy, for example, may be entitled to use a higher level of encryption then the level of encryption permitted by the country in which the embassy resides. In one embodiment, for example, the software program would detect the presence of Smart Card 122 and prompt the user for a password or system key. In response to receiving the appropriate key or password from the user, the geographically determined encryption level can be overridden. The use of a Smart Card to selectively override the geographically determined encryption level extends the flexibility of system 100 while maintaining adequate security measures to enforce the GPS determined encryption level.

Returning to the flow diagram of FIG. 200, one embodiment of method 200 includes a step 206 in which an encryption level override indicator is queried. If the encryption level override indicator is appropriately set, the geographically determined encryption level is overridden and an encryption level based upon some other selection criteria such as, for example, a user selectable encryption level is utilized. In an embodiment, in which the encryption level override is accomplished through the use of Smart Card 122 as discussed previously, method 200 may further include a step (not explicitly indicated in FIG. 2) of querying the user for a password or system key. If the appropriate password or key is not provided, the geographically determined encryption level is maintained. After appropriate setting of the encryption level, the remaining portions of the software application are executed (step 210) using the encryption level set in either step 204 or 208.

It will be apparent to those skilled in the art having the benefit of this disclosure that the present invention contemplates the dynamic adjustment of software encryption based upon the geographic location in which the software is executing. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. An encryption method, comprising:
   determining a geographic location associated with a software program including receiving information from a Global Positioning System, wherein the Global Positioning System comprises an I/O device of a computer system on which the software will execute;
   selecting an encryption level based upon the determined geographic location; and
   executing the software program utilizing the selected encryption level.

2. The method of claim 1, wherein determining the geographic location comprises determining the geographic location of a computer system on which the software program will be executed.

3. The method of claim 1, further comprising, overriding the selected encryption level responsive to receiving an encryption override signal.

4. The method of claim 1, wherein the encryption override signal is received from a Smart Card I/O device of a computer system OD which the software program will execute.

5. The method of claim 1, wherein selecting an encryption level comprises selecting an encryption level from a set of encryption levels including at least a first encryption level corresponding to a first geographic location, a second encryption level corresponding to a second geographic location, and a third encryption level corresponding to a third geographic location.

6. The method of claim 5, wherein the first encryption level comprises a 128-bit encryption level.

7. The method of claim 5, wherein the third encryption level comprises a 40-bit encryption level.

8. A computer system, comprising:
   a set of processors comprising at least one processor;
   a system memory accessible to the set of processors via a host bus;

an host bridge coupled between the host bus and a PCI compliant I/O bus; and a geographic locator adapted to communicate with the host bus via the I/O bus wherein the geographic locator comprises a PCI compliant Global Positioning System connected to the I/O bus;

wherein the system memory is configured with a set of instructions executable by the set of processors, the set of instructions comprising:

means for determining the geographic location of the computer system from the geographic locator;

means for selecting an encryption level based on the determined geographic location; and means for utilizing the selected encryption level when executing the set of instructions.

9. The computer system of claim 8, wherein the set of computer instruction further comprise, means for overriding the selected encryption level responsive to receiving an encryption override signal.

10. The computer system of claim 9, wherein the encryption override signal is received from a Smart Card I/O device of the computer system.

11. The computer system of claim 8, wherein the means for selecting an encryption level comprises means for selecting an encryption level from a set of encryption levels including at least a first encryption level corresponding to a first geographic location, a second encryption level corresponding to a second European geographic location, and a third encryption level corresponding to a third geographic location.

12. The computer system of claim 11, wherein the first encryption level comprises a 128-bit encryption level and the third encryption level comprises a 40-bit encryption level.

13. A computer program product, comprises a computer readable medium configured with a set of computer readable instructions, the set of instructions comprising:

means for determining a geographic location associated with a software program wherein the determining means comprises receiving information from a Global Positioning System and wherein the Global Positioning System comprises an I/O device of a computer system on which the software will execute means for selecting an encryption level based upon the determined geographic location; and means for executing the software program utilizing the selected encryption level.

14. The computer program product of claim 13, wherein determining the geographic location comprises determining the geographic location of a computer system on which the software program will be executed.

15. The computer program product of claim 13, further comprising, overriding the elected encryption level responsive to receiving an encryption override signal.

16. The computer program product of claim 13, wherein the encryption override signal is received from a Smart Card I/O device of a computer system on which the software program will execute.

17. The computer program product of claim 13, wherein selecting an encryption level comprises selecting an encryption level from a set of encryption levels including at least a first encryption level corresponding to a first geographic location, a second encryption level corresponding to a second European geographic location, and a third geographic location.

18. The computer program product of claim 17, wherein the first encryption level comprises a 128-bit encryption level and the third encryption level comprises a 40-bit encryption level.

* * * * *

UNITED STATES PATENT AND TRADEMARK OFFICE
CERTIFICATE OF CORRECTION

PATENT NO. : 6,931,130 B1
DATED : August 16, 2005
INVENTOR(S) : George Kraft IV and Richard Lee Verburg It is certified that error appears in the above-identified patent and that said Letters Patent is hereby corrected as shown below:

<u>Column 4,</u>
Lines 49-52, claim 4 should read:
-- The method of claim 1, wherein the encryption override signal is received from a Smart Card I/O device of a computer system on which the software program will execute. --.

Signed and Sealed this

Eleventh Day of October, 2005

JON W. DUDAS
*Director of the United States Patent and Trademark Office*